United States Patent
Jeon et al.

(10) Patent No.: US 11,245,455 B2
(45) Date of Patent: Feb. 8, 2022

(54) WIRELESS COMMUNICATION APPARATUS FOR LOW-COMPLEXITY BEAMFORMING FEEDBACK AND METHOD OF OPERATING THE APPARATUS

(71) Applicant: Samsung Electronics Co., Ltd., Suwon-si (KR)

(72) Inventors: Eunsung Jeon, Seoul (KR); Minki Ahn, Seoul (KR); Sungsoo Kim, Seoul (KR); Joonsuk Kim, Seoul (KR); Jinyong Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/025,389

(22) Filed: Sep. 18, 2020

(65) Prior Publication Data

US 2021/0184737 A1     Jun. 17, 2021

(30) Foreign Application Priority Data

Dec. 12, 2019    (KR) .................. 10-2019-0165998

(51) Int. Cl.
    *H04B 7/06*           (2006.01)
    *H04L 25/02*         (2006.01)

(52) U.S. Cl.
    CPC ............ *H04B 7/066* (2013.01); *H04B 7/0626* (2013.01); *H04L 25/0232* (2013.01)

(58) Field of Classification Search
    CPC ... H04B 7/0619; H04B 7/0626; H04B 7/0632
    See application file for complete search history.

(56) References Cited

U.S. PATENT DOCUMENTS

| 7,539,253 B2 | 5/2009 | Li et al. |
| 7,676,007 B1 | 3/2010 | Choi et al. |
| 8,345,732 B2 | 1/2013 | Fischer et al. |
| 9,178,590 B2 | 11/2015 | Kuo et al. |

(Continued)

FOREIGN PATENT DOCUMENTS

KR          101441672 B1     9/2014

OTHER PUBLICATIONS

"IEEE P802.11n," Part 11: Wireless LAN Medium Access Control (MAC) and Physical Layer (PHY) specifications. Amendment 5: Enhancement for Higher Throughput, Oct. 2009.

"Efficient Feedback of the Channel Information for Closedloop Beamforming in WLAN," Kim, J. et al. Home and Wireless Networking, Jun. 2006.

(Continued)

*Primary Examiner* — Kevin Kim
(74) *Attorney, Agent, or Firm* — Harness, Dickey & Pierce, P.L.C.

(57) ABSTRACT

A method of operating a wireless communication apparatus configured to support adaptive beamforming of a base station, the method including receiving a sounding packet from the base station through a plurality of sub-carriers, generating first channel information corresponding to first sub-carriers among the plurality of sub-carriers based on the sounding packet, performing an interpolation operation using the first channel information to generate second channel information corresponding to second sub-carriers among the plurality of sub-carriers, generating first beamforming feedback including the first channel information and the second channel information, and transmitting the first beamforming feedback to the base station.

20 Claims, 18 Drawing Sheets

(56) References Cited

U.S. PATENT DOCUMENTS

| | | |
|---|---|---|
| 2005/0105647 A1 | 5/2005 | Wilhelmsson et al. |
| 2006/0146856 A1 | 7/2006 | Jung et al. |
| 2006/0239374 A1 | 10/2006 | Aldana et al. |
| 2008/0069031 A1* | 3/2008 | Zhang ............ H04L 5/0028 370/328 |
| 2010/0074358 A1* | 3/2010 | Khojastepour ..... H04L 25/0204 375/267 |
| 2011/0013603 A1 | 1/2011 | Li et al. |
| 2011/0122961 A1* | 5/2011 | Sang ............ H04B 7/0617 375/267 |
| 2012/0082193 A1 | 4/2012 | Van Zelst et al. |
| 2013/0308713 A1* | 11/2013 | Zhang ............ H04B 7/0697 375/267 |
| 2017/0163446 A1* | 6/2017 | Li ............ H04W 72/085 |
| 2017/0223739 A1* | 8/2017 | Mallik ............ H04W 56/001 |

OTHER PUBLICATIONS

IEEE P802.11ac™/D7.0—Draft STANDARD for Information Technology, Telecommunications and information exchange between systems, Local metropolitan area networks, Specific Requirements: Part 11: Wireless LAN Medium Access Control (MAC) and Phyiscal Layer (PHY) specifications. Amendment 4: Enhancements for Very High Throughput for Operation in Bands below 6 GHz. Working Group of the 802 Committee, dated Sep. 2013.

IEEE P802.11ax™/D3.1, Draft Standard for Information technology, Telecommunications and information exchange between systems Local and metropolitan networks, Specific Requirements. Part 11: Wirelsss LAN Medium Access Control (MAC) and Physical Layer (PHY) Specifications. Amendment 6: Ehhancements for High Efficiency WLAN. 802.11 Working Group IEEE Computer Society, dated Aug. 2018.

* cited by examiner

FIG. 6A

Table1

|  | 20MHz | 40MHz | 80MHz | 160MHz |
|---|---|---|---|---|
| No interpolation | 52 | 108 | 234 | 468 |
| IS=2 | 30 | 58 | 122 | 248 |
| IS=4 | 16 | 30 | 62 | 126 |
| IS=8 | 10 | 16 | 32 | 66 |

FIG. 7A

Table2

|  | 20MHz | 40MHz | 80MHz | 160MHz |
|---|---|---|---|---|
| No interpolation | 64 | 122 | 250 | 506 |
| IS=8 | 34 | 62 | 126 | 254 |
| IS=16 | 20 | 32 | 64 | 128 |
| IS=32 | 12 | 18 | 34 | 66 |

FIG. 12

Table3

| SNR | 8dB | 16dB | 24dB | 32dB | 40dB | 48dB |
|---|---|---|---|---|---|---|
| Threshold | 100 (ns) | 80 (ns) | 60 (ns) | 40 (ns) | 20 (ns) | 10 (ns) |

WIRELESS COMMUNICATION APPARATUS FOR LOW-COMPLEXITY BEAMFORMING FEEDBACK AND METHOD OF OPERATING THE APPARATUS

CROSS-REFERENCE TO RELATED APPLICATION

This application claims the benefit of Korean Patent Application No. 10-2019-0165998, filed on Dec. 12, 2019, in the Korean Intellectual Property Office, the disclosure of which is incorporated herein in its entirety by reference.

BACKGROUND

The inventive concepts relate to a wireless communication apparatus, and more particularly, to a wireless communication apparatus configured to support adaptive beamforming of a base station and a method of operating the wireless communication apparatus.

A wireless communication system based on a multi-antenna may improve a data transmission rate through a beamforming process between transmitting and receiving terminals in a cellular communication environment. A beamforming scheme may be operated based on a channel state between a base station and a wireless communication apparatus. In general, the wireless communication apparatus (or the receiving terminal) may generate beamforming feedback including information about a beamforming matrix or information about a beamforming steering matrix by using a channel estimated using a reference signal, and transmit the beamforming feedback to the base station (or the transmitting terminal).

Research is being conducted into a wireless communication apparatus configured to perform a beamforming process for improving the performance of a wireless communication system. Because a large number of calculation processes are performed for the wireless communication apparatus to generate the beamforming feedback, research is also being conducted to reduce the number of calculation processes.

SUMMARY

The inventive concepts provide a wireless communication apparatus capable of generating beamforming feedback, which used to perform a beamforming operation for improving the performance of a wireless communication system, with a minimum or low amount of calculations and a method of operating the wireless communication apparatus.

According to an aspect of the inventive concepts, there is provided a method of operating a wireless communication apparatus configured to support adaptive beamforming of a base station. The method includes including receiving a sounding packet from the base station through a plurality of sub-carriers, generating first channel information corresponding to first sub-carriers among the plurality of sub-carriers based on the sounding packet, performing an interpolation operation using the first channel information to generate second channel information corresponding to second sub-carriers among the plurality of sub-carriers, generating first beamforming feedback including the first channel information and the second channel information, and transmitting the first beamforming feedback to the base station.

According to an aspect of the inventive concepts, there is provided a method of operating a wireless communication apparatus configured to support adaptive beamforming of a base station. The method includes receiving a sounding packet from the base station through a plurality of sub-carriers, selecting first sub-carriers from among the plurality of sub-carriers based on a selectivity of a channel between the base station and the wireless communication apparatus, and selectively performing a normal beamforming feedback generation operation or a low-complexity beamforming feedback generation operation based on the selectivity of the channel, wherein the normal beamforming feedback generation operation is performed to directly generate first channel information corresponding to the first sub-carriers and second channel information corresponding to second sub-carriers among the plurality of sub-carriers, and the low-complexity beamforming feedback generation operation is performed to indirectly generate the second channel information based on an interpolation operation using the first channel information.

According to an aspect of the inventive concepts, there is provided a beamforming method of a wireless communication system including a base station and a wireless communication apparatus. The method includes receiving a sounding packet from the base station through a plurality of sub-carriers, wherein the receiving is performed by the wireless communication apparatus, generating first channel information corresponding to first sub-carriers among the plurality of sub-carriers using the sounding packet, wherein the generating is performed by the wireless communication apparatus, generating second channel information corresponding to second sub-carriers among the plurality of sub-carriers based on an interpolation operation using the first channel information, wherein the generating is performed by the wireless communication apparatus, transmitting beamforming feedback including the first channel information and the second channel information to the base station, wherein the transmitting is performed by the wireless communication apparatus, and receiving a data signal to which beamforming is applied from the base station based on the beamforming feedback, wherein the receiving is performed by the wireless communication apparatus.

BRIEF DESCRIPTION OF THE DRAWINGS

Embodiments of the inventive concepts will be more clearly understood from the following detailed description taken in conjunction with the accompanying drawings in which:

FIG. 6A is a table diagram showing interpolation spacings according to an example embodiment;

FIG. 7A is a table diagram showing interpolation spacings according to an example embodiment;

FIG. 12 is a table diagram showing the arrangement of threshold values with respect to SNRs, wherein the threshold values are used as criteria for selecting any one of a low-complexity beamforming feedback generation operation and a normal beamforming feedback generation operation;

DETAILED DESCRIPTION

Hereinafter, embodiments will be described in detail with reference to the accompanying drawings.

Figure 1:
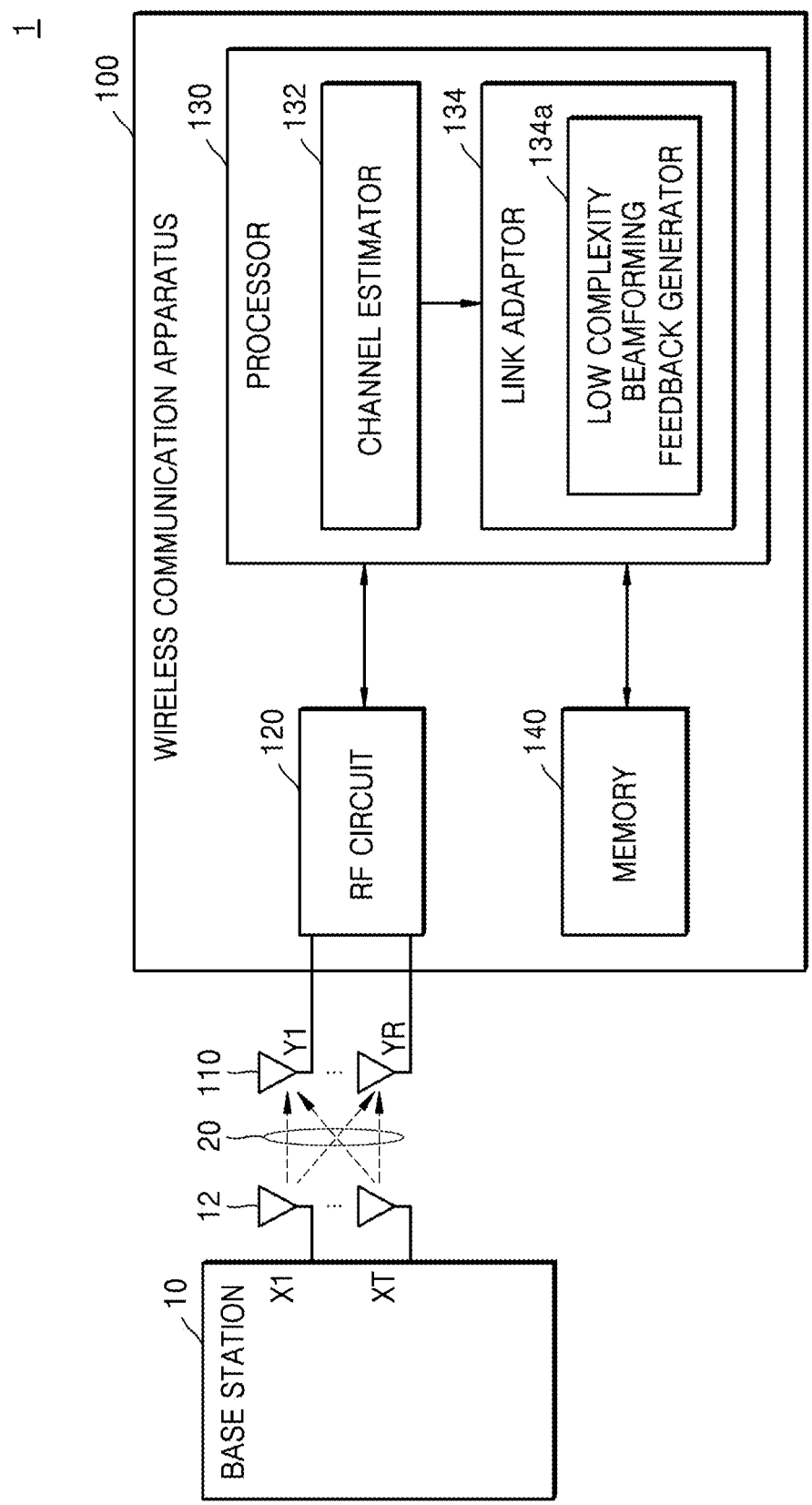
FIG. 1 is a schematic block diagram of a wireless communication system according to an embodiment.

FIG. 1 is a schematic block diagram of a wireless communication system 1 according to an embodiment.

Referring to FIG. 1, the wireless communication system 1 may include a wireless communication apparatus 100 and a base station 10. The wireless communication apparatus 100 may communicate with the base station 10 through a channel 20 (also referred to herein as a "downlink channel"). The wireless communication system 1 may be referred to as a multi-input multi-output (MIMO) system. The wireless communication system 1 may include a long-term evolution (LTE) system, a code division multiple access (CDMA) system, a global system for mobile communications (GSM) system, a wireless local area network (WLAN), and/or another wireless communication system, but is not limited thereto. The wireless communication system 1 may support an adaptive modulation & coding (AMC) scheme, which determines a modulation scheme and a channel coding rate according to a state of the downlink channel 20. The wireless communication system 1 may include T transmitting antennas 12 and R receiving antennas 110.

The wireless communication apparatus 100 may refer to various pieces of equipment capable of communicating with the base station 10 and transmitting and/or receiving data and/or control information. For example, the wireless communication apparatus 100 may be referred to as user equipment (UE), a mobile station (MS), a mobile terminal (MT), a user terminal (UT), a subscriber station (SS), a handheld device, or the like. Also, the base station 10 may refer to a stationary station configured to communicate with the wireless communication apparatus 100 and/or another base station. The base station 10 may communicate with the wireless communication apparatus and/or another base station and transmit and/or receive data and/or control information. For example, the base station 10 may be referred to as Node B, evolved-Node B (eNB), a base transceiver system (BTS), an access point (AP), or the like.

A wireless communication network between the wireless communication apparatus 100 and the base station 10 may share available network resources and support the communication of a plurality of users. For example, in the wireless communication network, information may be transmitted using various methods, such as code division multiple access (CDMA), frequency division multiple access (FDMA), time division multiple access (TDMA), orthogonal frequency division multiple access (OFDMA), and/or single carrier frequency division multiple access (SC-FDMA).

The wireless communication apparatus 100 may include the R receiving antennas 110, a radio-frequency (RF) circuit 120, a processor 130, and/or a memory 140. Each of components included in the wireless communication apparatus 100 may include a hardware block including an analog circuit and/or a digital circuit or a software block including a plurality of instructions executed by the processor 130. The RF circuit 120 may receive a signal (e.g., a downlink signal) from the base station 10 through the R receiving antennas 110. The received signal may be an RF signal having a high central frequency. The RF circuit 120 may include an analog down-conversion mixer, down-convert a frequency of the received signal by using the analog down-conversion mixer, and generate a baseband signal. Also, the RF circuit 120 may further include an analog-to-digital converter and perform a processing operation of, for example, converting the baseband signal into a digital signal.

The processor 130 may include a channel estimator 132 and/or a link adaptor 134. Hereinafter, the channel estimator 132 and the link adaptor 134 will be illustrated and described as separate blocks included in the processor 130. However, the inventive concepts are not limited thereto, and the processor 130 may be an integrated logic block capable of performing an operation of the channel estimator 132 and an operation of the link adaptor 134. Also, the operation of the channel estimator 132 and the operation of the link adaptor 134 may be referred to as an operation of the processor 130.

The channel estimator 132 may estimate the downlink channel 20 using a reference signal included in a sounding packet received from the base station 10. The sounding packet may be a signal transmitted by the base station 10 to the wireless communication apparatus 100 to perform a beamforming process appropriate for the downlink channel 20. The sounding packet may be referred to as a null data packet. Also, the base station 10 may transmit the sounding packet to the wireless communication apparatus 100 over a plurality of sub-carriers. In this case, the downlink channel 20 may include channels corresponding respectively to the plurality of sub-carriers. Hereinafter, the channels corresponding to the sub-carriers may be defined as channels experienced by the sub-carriers during the transmission of the sounding packet to the wireless communication apparatus 100. The channel estimator 132 according to an example embodiment may selectively estimate first channels corresponding to first sub-carriers, from among the plurality of sub-carriers, to generate beamforming feedback. The first sub-carriers may be defined as reference sub-carriers, which are previously set to perform an interpolation operation used for generating the beamforming feedback afterwards.

The link adaptor 134 according to an example embodiment may include a low-complexity beamforming feedback generator 134a. Hereinafter, the low-complexity beamforming feedback generator 134a will also be referred to as a beamforming feedback generator 134a herein. The link adaptor 134 may perform a singular value decomposition (SVD) process on the estimated first channels and generate first channel information pieces (also referred to herein as "first channel information"). The first channel information pieces may include angular channel information pieces, which are generated using beam-steering matrices obtained due to the SVD process or include pieces of information about singular values corresponding respectively to the first channels generated using diagonal matrices obtained due to the SVD process.

In an example embodiment, the low-complexity beamforming feedback generator 134a may perform an interpolation operation using the first channel information pieces to generate second channel information pieces (also referred to herein as "second channel information") corresponding to second sub-carriers of the plurality of sub-carriers. The low-complexity beamforming feedback generator 134a may indirectly generate the second channel information pieces corresponding to the second sub-carriers using the first channel information pieces, which are previously generated, without performing the SVD process. The number of first sub-carriers or an interpolation spacing may vary according to a state of the downlink channel 20. The interpolation spacing may be defined as a unit frequency spacing by which the first sub-carriers are apart from each other on a frequency axis. For example, as a selectivity of the downlink channel 20 is reduced, the number of first sub-carriers may be set to decrease or the interpolation spacing may be set to increase. That is, as the number of first sub-carriers is reduced (or as the interpolation spacing increases), the amounts of the second channel information pieces corresponding to the second sub-carriers, which are to be generated using the interpolation operation, may be increased, but the total amount of calculations performed by the processor 130 to generate the beamforming feedback may be further reduced. In addition, the number of first sub-carriers or the interpolation spacing may be varied by further considering a frame format supported by the wireless communication system 1. According to some example embodiments, the first sub-carriers may be different sub-carriers among the plurality of sub-carriers from the second sub-carriers.

Conventional devices for generating beamforming feedback perform channel estimation and singular value decomposition (SVD) on all received sub-carriers to generate channel information for beamforming feedback. In so doing, the conventional devices perform excessive SVD calculations of high complexity resulting in excessive resource consumption (e.g., power, processor, memory, delay, etc.).

However, some example embodiments provide improved wireless communication devices that perform channel estimation and SVD on fewer than all of the received sub-carriers. The improved wireless communication devices then perform interpolation based on the results of the SVD to obtain channel information for beamforming feedback. Accordingly, the improved wireless communication devices obtain the channel information while performing fewer complex SVD calculations, thereby reducing complexity and resource consumption (e.g., power, processor, memory, delay etc.).

The low-complexity beamforming feedback generator 134a may apply an appropriate interpolation scheme to the interpolation operation using the first channel information pieces considering a type of the first channel information pieces. For example, when the first channel information pieces include the angular channel information pieces, the low-complexity beamforming feedback generator 134a may perform an interpolation operation using the first channel information pieces based on an angular interpolation scheme. When the first channel information pieces include pieces of information related to singular values, the low-complexity beamforming feedback generator 134a may perform an interpolation operation using the first channel information pieces based on a linear interpolation scheme. As described above, an operation of interpolating some channel information pieces and generating other channel information pieces by the low-complexity beamforming feedback generator 134a may be referred to as a low-complexity beamforming feedback generation process.

The low-complexity beamforming feedback generator 134a may generate beamforming feedback including the first channel information and the second channel information and transmit the beamforming feedback to the base station 10. The base station 10 may transmit a data signal to which beamforming is applied based on the beamforming feedback, to the wireless communication apparatus 100. The low-complexity beamforming feedback generator 134a may generate the beamforming feedback in a predetermined or alternatively, given short inter-frame space (SFIS) and transmit the beamforming feedback to the base station 10.

In an example embodiment, the processor 130 may selectively perform any one of a normal beamforming feedback generation process and/or a low-complexity beamforming feedback generation process according to a state of the downlink channel 20. For example, when the selectivity of the downlink channel 20 exceeds a predetermined or alternatively, given threshold value, a channel variation between sub-carriers that are adjacent on the frequency axis may be likely to deviate from an allowable range, and thus, the low-complexity beamforming feedback generation process may not be appropriate or desirable. Accordingly, the processor 130 may perform the normal beamforming feedback generation process. Hereinafter, the normal beamforming feedback generation process will be described.

To generate beamforming feedback, the channel estimator 132 may generate third channels corresponding to the first sub-carriers and the second sub-carriers out of the plurality of sub-carriers. The sum of the number of first sub-carriers and the number of second sub-carriers may be less than or equal to the number of sub-carriers according to the frame format supported by the wireless communication system 1 (e.g., by the base station 10). The link adaptor 134 may perform an SVD process on estimated third channels and generate third channel information pieces (also referred to herein as "third channel information"). The low-complexity beamforming feedback generator 134a may generate beamforming feedback including the third channel information pieces and transmit the beamforming feedback to the base station 10.

Moreover, the memory 140 may include reference information used for the low-complexity beamforming feedback generation process. The reference information may include information about the interpolation spacing and/or the number of reference sub-carriers according to a communication environment of the wireless communication apparatus 100, and/or criteria for determining whether to perform the low-complexity beamforming feedback process according to the communication environment of the wireless communication apparatus 100. The reference information will be described below with reference to FIGS. 6A, 7A, and 12. The processor 130 may perform the low-complexity beamforming feedback generation process based on information stored in the memory 140.

Hereinafter, operations of the wireless communication system 1 will be described for simplicity, and the wireless communication system 1 may be assumed to be a rank-2 WLAN system. Thus, it is assumed that the base station 10 performs wireless communication using two transmitting antennas 12, and the wireless communication apparatus 100 performs wireless communication using two receiving antennas 110. However, while the wireless communication system 1 is assumed to be a rank-2 WLAN system for simplicity, the inventive concepts are not limited thereto, and various ranks and various networks may be used as the wireless communication system 1.

To begin with, when the base station 10 transmits signals X1 and X2 through the two transmitting antennas 12, the wireless communication apparatus 100 may receive signals Y1 and Y2 through the two receiving antennas 110. The received signals Y1 and Y2 may be results obtained by using the downlink channel 20, and the transmitted signals X1 and X2 and the received signals Y1 and Y2 may be in a relationship as shown in Equation (1):

$$Y = H \cdot X + N \quad (1)$$

In Equation (1), each element may be a vector or a matrix. 'N' denotes white Gaussian noise, and 'Y' may be a 2×1 matrix of received signals Y1 and Y2. 'X' may be a 2×1 matrix of transmitted signals X1 and X2. 'H' may be a channel matrix, which is a 2×2 matrix. 'H' may denote a frequency response between the base station 10 and the wireless communication apparatus 100. The channel estimator 132 may generate a channel matrix H of the downlink channel 20.

The link adaptor 134 may perform an SVD process on the channel matrix H as shown in Equation (2):

$$H = U \Sigma V^* \quad (2)$$

wherein 'U' and 'V' may be unitary matrices, and 'Σ' may be a diagonal matrix including non-negative singular values (e.g., σ1 and σ2) of the downlink channel 20. 'V*' may be a conjugate transpose matrix of 'V.' Also, 'U*' may be a conjugate transpose matrix of 'U,' and the processor 130 may apply 'U*' to the channel matrix H. The link adaptor 134 may generate the 'V' using the 'V*,' and 'V' may refer to a beam-steering matrix. The low-complexity beamforming feedback generator 134a may generate beamforming feedback based on the beam-steering matrix V and/or the diagonal matrix Σ. For example, the beamforming feedback may include a precoding matrix indicator (PMI). The base station 10 may perform an adaptive beamforming process based on the beamforming feedback. As a result, the transmitted signals X1 and X2 and the received signals Y1, Y2 may be in a relationship as shown in Equation (3):

$$Y = H \cdot V \cdot X + N \quad (3)$$

When 'U*' is applied to 'Y' in Equation (3) by the processor 130 of the wireless communication apparatus 100, the following Equation (4) may be derived.

$$Y' = U^* Y = U^*(H \cdot V \cdot X + N) = U^* \cdot (U \Sigma V^* \cdot V \cdot X + N) = \Sigma X + N' \quad (4)$$

As described above, as a result of the adaptive beamforming process performed by the base station 10, the signals Y1 and Y2 received by the wireless communication apparatus 100 may be defined as the transmitted signals X1 and X2 in which the singular values of the downlink channel 20 and noise N' are reflected.

Figure 2:
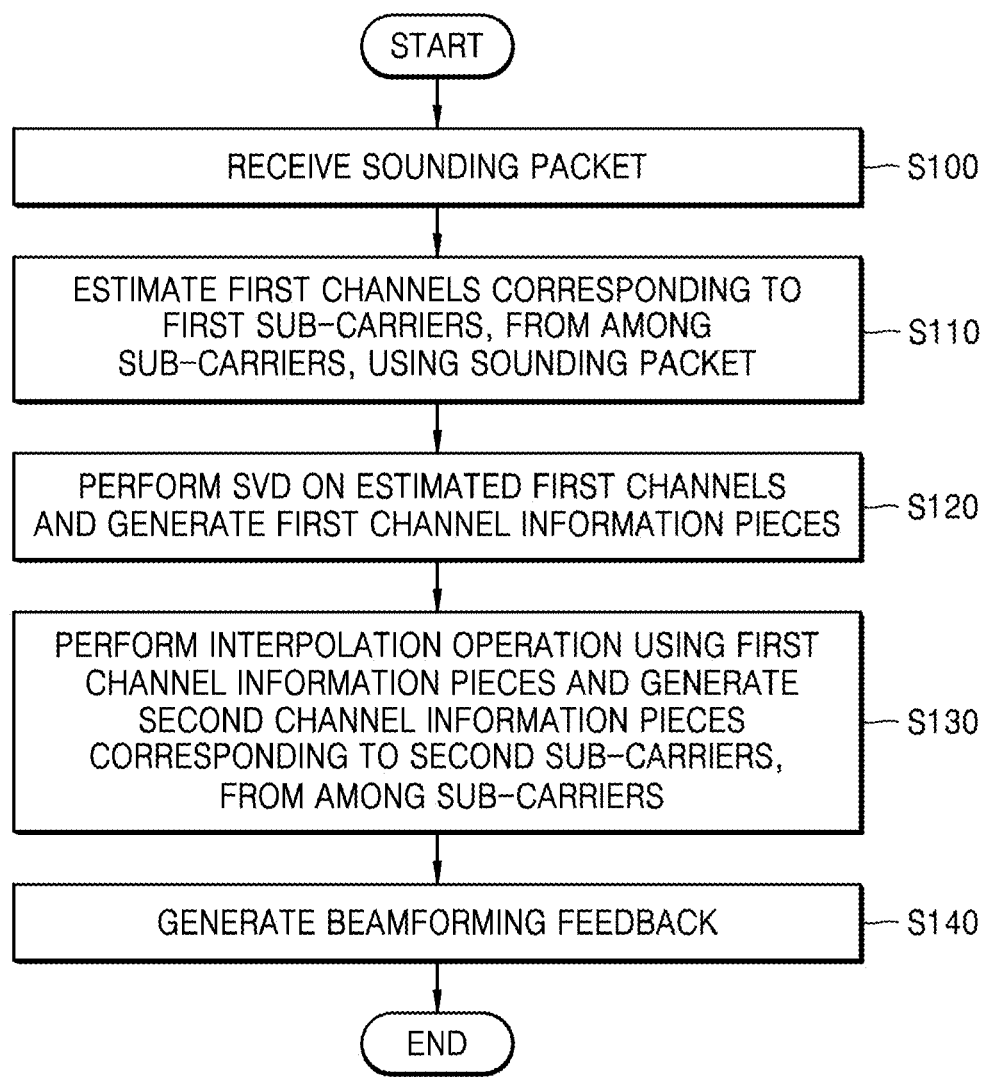
FIG. 2 is a flowchart illustrating a method of operating a wireless communication apparatus, according to an example embodiment.

FIG. 2 is a flowchart illustrating a method of operating a wireless communication apparatus, according to an example embodiment.

Referring to FIG. 2, in operation S100, the wireless communication apparatus may receive a sounding packet from a base station through a plurality of sub-carriers. In operation S110, the wireless communication apparatus may estimate first channels corresponding to first sub-carriers of the sub-carriers by using the sounding packet. The number of first sub-carriers may be differently set according to a channel state between the wireless communication apparatus and the base station. In operation S120, the wireless communication apparatus may perform an SVD process on the estimated first channels and generate first channel information pieces. The first channel information pieces may be generated based on diagonal matrices and/or beam-steering matrices corresponding to the estimated first channels and include pieces of information used for the base station to perform an adaptive beamforming process. In operation S130, the wireless communication apparatus may perform an interpolation operation using the first channel information pieces and generate second channel information pieces corresponding to second sub-carriers of the sub-carriers. That is, the wireless communication apparatus may estimate second channels corresponding to the second sub-carriers to generate the second channel information pieces, skip a series of operations of an SVD process on the estimated second channels, and indirectly generate the second channel information pieces using the interpolation operation using the first channel information pieces. In operation S140, the wireless communication apparatus may generate beamforming feedback including the first channel information pieces and the second channel information pieces and transmit the beamforming feedback to the base station.

A low-complexity beamforming feedback generation operation according to an example embodiment may include operations S110 to S140. As described above, the wireless communication apparatus may selectively perform any one of a low-complexity beamforming feedback generation operation and a normal beamforming feedback generation operation according to a channel state between the wireless communication apparatus and the base station.

Figure 3:
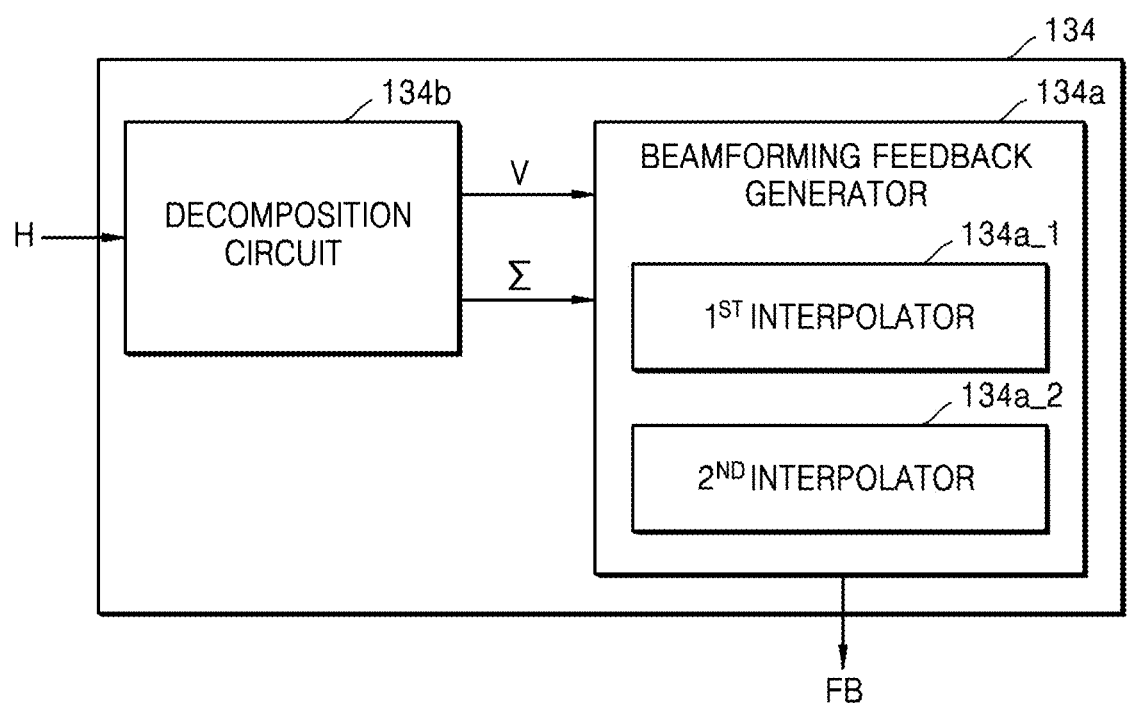
FIG. 3 is a block diagram of a link adaptor according to an example embodiment.

FIG. 3 is a block diagram of a link adaptor 134 according to an example embodiment.

Referring to FIG. 3, the link adaptor 134 may include a beamforming feedback generator 134a and/or a decomposition circuit 134b. The decomposition circuit 134b may receive estimated first channels H corresponding to first sub-carriers, from among a plurality of sub-carriers, and perform an SVD process on the first channels H. The decomposition circuit 134b may generate beam-steering matrices V and/or diagonal matrices/from the first channels H due to the SVD process and provide beam-steering matrices V and/or diagonal matrices Σ to the beamforming feedback generator 134a. The beamforming feedback generator 134a may generate first channel information pieces corresponding to the first channels H using the beam-steering matrices V and/or the diagonal matrices Σ.

The beamforming feedback generator 134a may include a first interpolator 134a_1 and/or a second interpolator 134a_2. The first interpolator 134a_1 may perform an interpolation operation on the first channel information pieces, which are generated using the beam-steering matrices V, based on a first-type interpolation scheme. In addition, the second interpolator 134a_2 may perform an interpolation operation on the first channel information pieces, which are generated using the diagonal matrices Σ, based on a second-type interpolation scheme. The operations of the first interpolator 134a_1 and the second interpolator 134a_2 will be described in detail below with reference to FIGS. 4 and 5.

The beamforming feedback generator 134a may perform the interpolation operation on the first channel information pieces and generate second channel information pieces corresponding to second sub-carriers, from among the plurality of sub-carriers. The beamforming feedback generator 134a may generate beamforming feedback FB including the first channel information pieces and the second channel information pieces.

Figure 4:
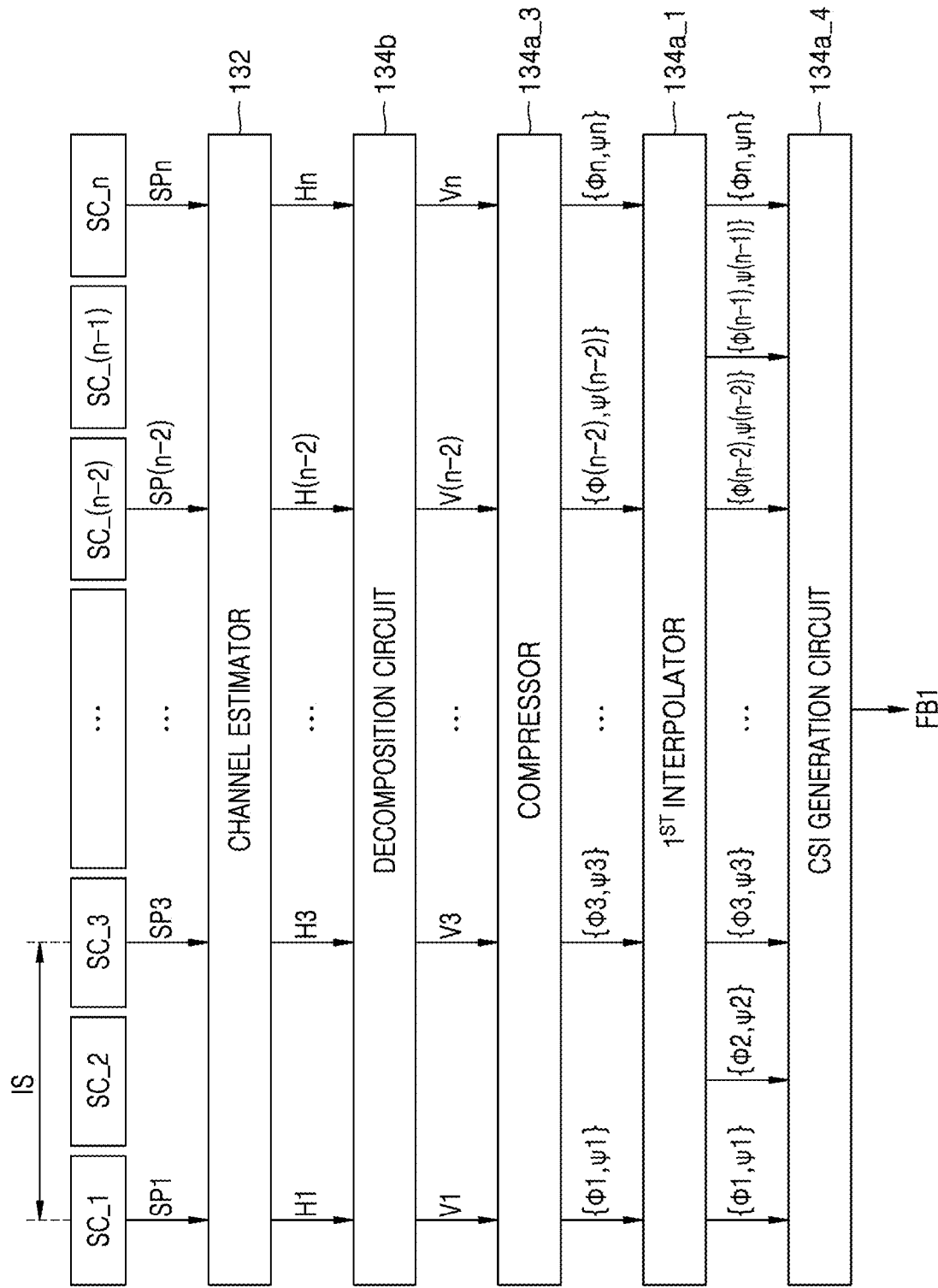
FIG. 4 is a diagram illustrating an operation of a first interpolator of FIG. 3.
Figure 5:
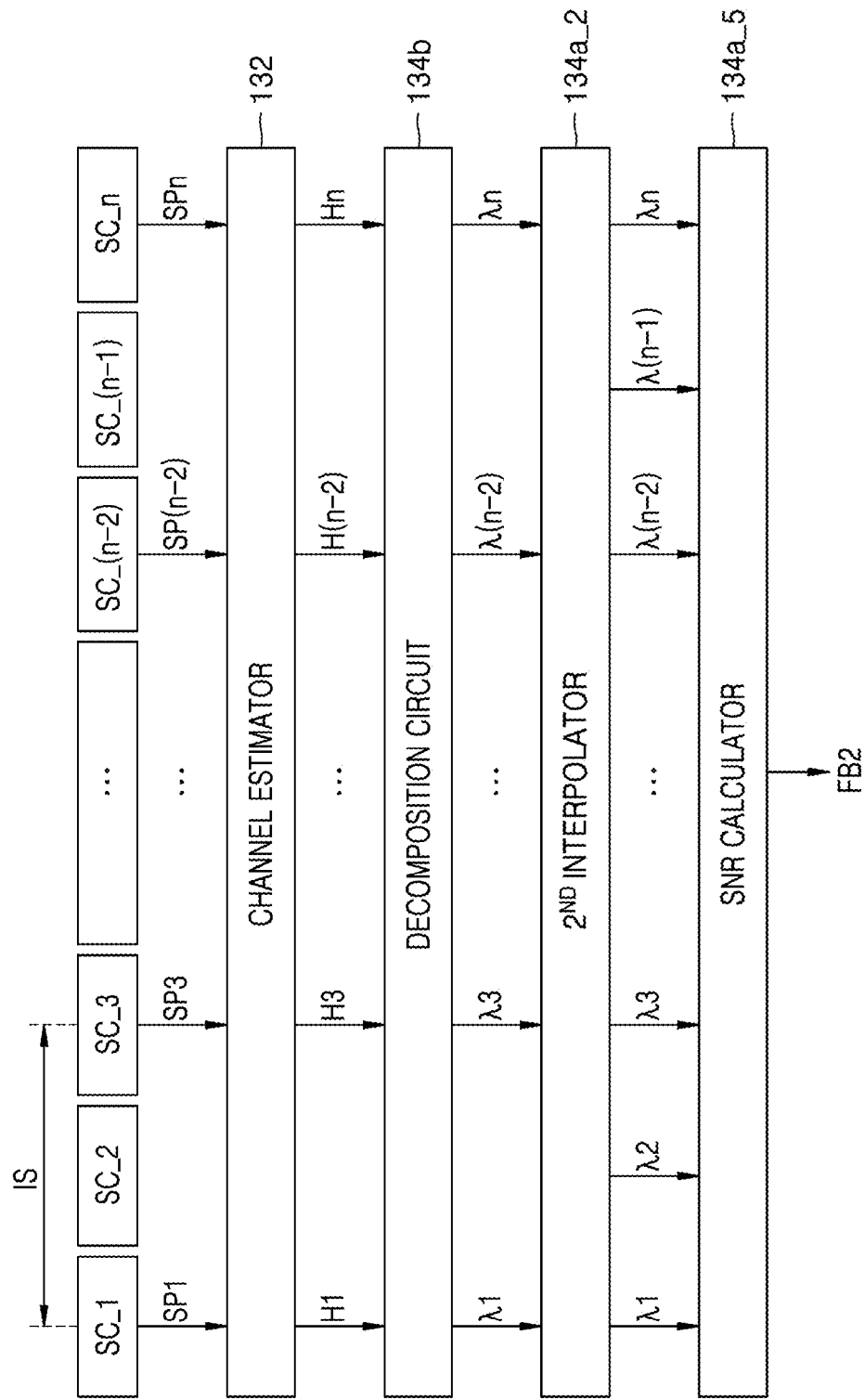
FIG. 5 is a diagram illustrating an operation of a second interpolator of FIG. 3.

FIG. 4 is a diagram illustrating an operation of the first interpolator 134a_1 of FIG. 3. FIG. 5 is a diagram illustrating an operation of the second interpolator 134a_2 of FIG. 3.

Referring to FIG. 4, the beamforming feedback generator 134a may further include a compressor 134a_3 and/or a channel-state information (CSI) generation circuit 134a_4. A channel estimator 132 may estimate first channels H1, H3, . . . , H(n−2), and Hn by using sounding packets SP1, SP3, . . . , SP_(n−2), and SP_n, which are received through first sub-carriers SC_1, SC_3, . . . , SC_(n−2), and SC_n having an interpolation spacing IS, from among a plurality of sub-carriers SC_1 to SC_n. As described above, the interpolation spacing IS may be varied according to a channel state between a wireless communication apparatus and a base station. According to some example embodiments, the plurality of sub-carriers SC_1 to SC_n have a constant frequency spacing therebetween, and the interpolation spacing IS corresponds to the constant frequency spacing between the plurality of sub-carriers SC_1 to SC_n.

The decomposition circuit 134b may perform an SVD process on the first channels H1, H3, . . . , H(n−2), and Hn and generate beam-steering matrices V1, V3, . . . , V(n−2), and Vn corresponding respectively to the first channels H1, H3, . . . , H(n−2), and Hn. The compressor 134_a3 may compress the beam-steering matrices V1, V3, . . . , V(n−2), and Vn using given rotations and generate first channel information pieces {Φ1,ψ1}, {Φ3,ψ3}, . . . , {Φ(n−2),ψ(n−2)}, and {Φn,ψn} of an angular type, which indicate phases and sizes of the beam-steering matrices V1, V3, . . . , V(n−2), and Vn.

The first interpolator 134a_1 may perform an interpolation operation on the first channel information pieces {Φ1, ψ1}, {Φ3,ψ3}, . . . , {Φ(n−2),ψ(n−2)}, and {Φn,ψn}. The first interpolator 134a_1 may perform the interpolation operation based on an angular interpolation scheme. The first interpolator 134a_1 may generate second channel information pieces {Φ2,ψ2}, . . . , and {Φ(n−1), ψ(n−1)} corresponding to second sub-carriers SC_2, . . . , and SC(n−1) as a result of the interpolation operation. For example, the first interpolator 134a_1 may perform an interpolation operation using a channel information piece {Φ1,ψ1} corresponding to one sub-carrier SC_1 and a channel information piece {Φ3,ψ3} corresponding to another sub-carrier SC_3, which is apart from the sub-carrier SC_1 by the interpolation spacing IS, and generate a channel information piece {Φ2,ψ2} corresponding to the sub-carrier SC_2 located between the sub-carriers SC_1 and SC_3.

The CSI generation circuit 134a_4 may quantize the first channel information pieces {Φ1,ψ1}, {Φ3,ψ3}, . . . , {Φ(n−2),ψ(n−2)}, and {Φn,ψn} and the second channel information pieces {Φ2,ψ2}, . . . , and {Φ(n−1), ψ(n−1)} according to specifications defined by the standard, and generate the quantized channel information pieces as beamforming feedback FB1.

Referring to FIG. 5, the beamforming feedback generator (refer to 134 in FIG. 3) may further include a signal-to-noise ratio (SNR) calculator 134a_5. The channel estimator 132 may estimate first channels H1, H3, . . . , H(n−2), and Hn by using sounding packets SP1, SP3, . . . , SP(n−2), and SPn, which are received through first sub-carriers SC_1, SC_3, . . . , SC_(n−2), and SC_n having an interpolation spacing IS, from among a plurality of sub-carriers SC_1 to SC_n.

The decomposition circuit 134b may perform an SVD process on the first channels H1, H3, . . . , H(n−2), and Hn and generate first channel information pieces λ1, λ3, . . . , λ(n−2), and λn including singular values of diagonal matrices corresponding respectively to the first channels H1, H3, . . . , H(n−2), and Hn.

The second interpolator 134a_2 may perform an interpolation operation on the first channel information pieces λ1, λ3, . . . , λ(n−2), and λn. Because singular values may be real number values, the second interpolator 134a_2 may perform the interpolation operation based on a linear interpolation scheme. The second interpolator 134a_2 may generate second channel information pieces λ2, . . . , and λ(n−1) corresponding to second sub-carriers SC_2, . . . , and SC(n−1) as a result of the interpolation operation. For example, the second interpolator 134a_2 may perform an interpolation operation using the channel information piece λ1 corresponding to one sub-carrier SC_1 and the channel information piece λ3 corresponding to another sub-carrier SC_3, which is apart from the sub-carrier SC_1 by the interpolation spacing IS, and generate the channel information piece λ2 corresponding to the sub-carrier SC_2 located between the sub-carriers SC_1 and SC_3.

The SNR calculator 134a_5 may generate SNRs corresponding to the sub-carriers SC_1 to SC_n as beamforming feedback FB2 by using the first channel information pieces λ1, λ3, . . . , λ(n−2), and λn and the second channel information pieces λ2, . . . , and λ(n−1). For example, the SNR corresponding to one sub-carrier SC_1 may be obtained by applying the singular value included in the channel information piece λ1 to a predetermined or alternatively, given calculation formula (e.g., a calculation of a square of the singular value).

Figure 6B:
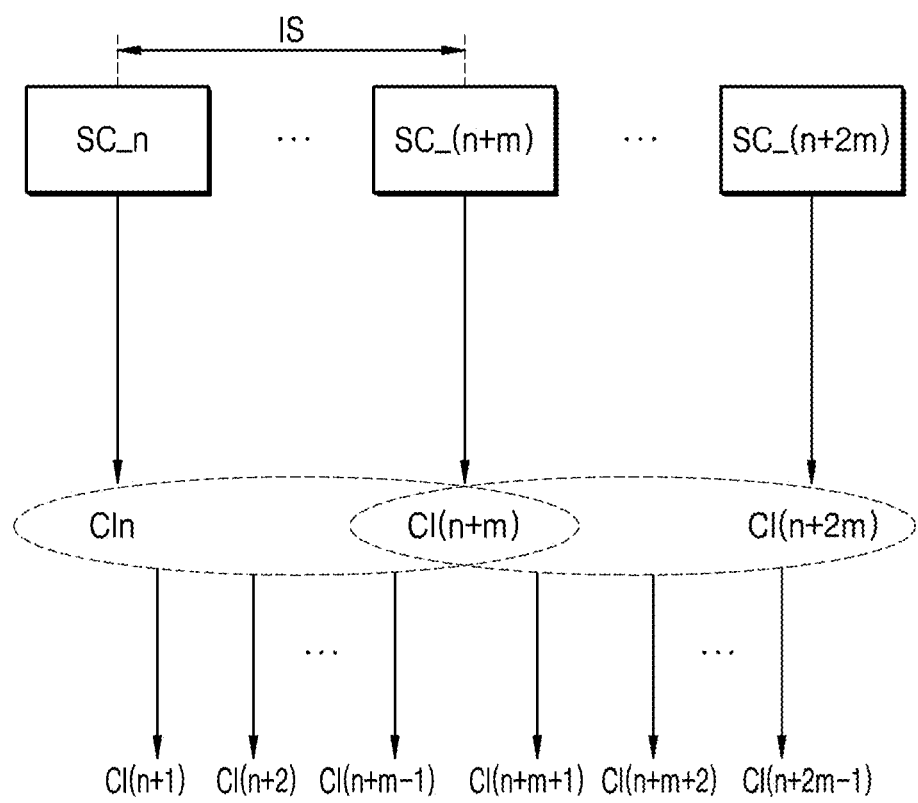
FIG. 6B is a diagram illustrating an operation of interpolating a wireless communication apparatus based on the table diagram of FIG. 6A.

FIG. 6A is a diagram of a first table Table1 showing interpolation spacings according to an example embodiment. FIG. 6B is a diagram illustrating an operation of interpolating a wireless communication apparatus based on the first table Table1 of FIG. 6A. However, the following descriptions will now be presented for simplicity, but it will be understood that they are merely examples and the inventive concepts are not limited thereto. It is assumed that examples shown in FIGS. 6A and 6B are obtained in a communication environment having a very-high throughput (VHT) frame format defined by the Institute of Electrical and Electronics Engineers (IEEE) standards.

Referring to FIG. 6A, the number of subcarriers may differ according to a frequency bandwidth of a channel between the wireless communication apparatus and a base station. For example, the total number of sub-carriers may be 52 at a frequency bandwidth of 20 MHz, be 108 at a frequency bandwidth of 40 MHz, be 234 at a frequency bandwidth of 80 MHz, and be 468 at a frequency bandwidth of 160 MHz. When an interpolation spacing IS is set to '1,' the wireless communication apparatus may perform a normal beamforming feedback generation operation and directly generate channel information pieces corresponding to all sub-carriers. When the interpolation spacing IS is set to '2' in the wireless communication apparatus, the number of reference sub-carriers may be 30 at a frequency bandwidth of 20 MHz, be 58 at a frequency bandwidth of 40 MHz, be 122 at a frequency bandwidth of 80 MHz, and be 248 at a frequency bandwidth of 160 MHz. When the interpolation spacing IS is set to '4' in the wireless communication apparatus, the number of reference sub-carriers may be 16 at a frequency bandwidth of 20 MHz, be 30 at a frequency bandwidth of 40 MHz, be 62 at a frequency bandwidth of 80 MHz, and be 126 at a frequency bandwidth of 160 MHz. When the interpolation spacing IS is set to '8' in the wireless communication apparatus, the number of reference sub-carriers may be 10 at a frequency bandwidth of 20 MHz, be 16 at a frequency bandwidth of 40 MHz, be 32 at a frequency bandwidth of 80 MHz, and be 66 at a frequency bandwidth of 160 MHz. In an example embodiment, an interpolation spacing IS in a low-complexity beamforming feedback generation operation may be defined as the k-th power of 2 (here, k is an integer more than or equal to 1).

The interpolation spacing IS may be varied based on a selectivity of the channel between the wireless communication apparatus and the base station. For example, the interpolation spacing IS may be reduced in an environment in which the selectivity of the channel is high, while the interpolating spacing IS may be increased in an environment in which the selectivity of the channel is low. As a result, the wireless communication apparatus may perform a flexible low-complexity beamforming feedback generation operation according to a state of the channel.

Referring to FIG. 6B, an interpolation operation may be performed using an n-th channel information piece CIn corresponding to an n-th sub-carrier SC_n and an (n+m)-th channel information piece CI(n+m) corresponding to an (n+m)-th sub-carrier SC_(n+m), which is apart from the n-th sub-carrier SC_n by an interpolation spacing IS of 'm,' to generate channel information pieces CI(n+1) to CI(n+m−1) (e.g., the channel information pieces CI(n+1), CI(n+2), . . . , CI(n+m−1)) corresponding respectively to (n+1)-th to (n+m−1)-th sub-carriers. Also, an interpolation operation may be performed using the (n+m)-th channel information piece CI(n+m) corresponding to the (n+m)-th sub-carrier SC_(n+m) and an (n+2m)-th channel information piece CI(n+2m) corresponding to an (n+2m)-th sub-carrier SC_(n+2m), which is apart from the (n+m)-th sub-carrier SC_(n+m) by the interpolation spacing IS of 'm,' to generate channel information pieces CI(n+m+1) to CI(n+2m−1) (e.g., the channel information pieces CI(n+m+1), CI(n+m+2), . . . , CI(n+2m−1)) corresponding respectively to (n+m+1)-th to (n+2m−1)-th sub-carriers.

Figure 7B:
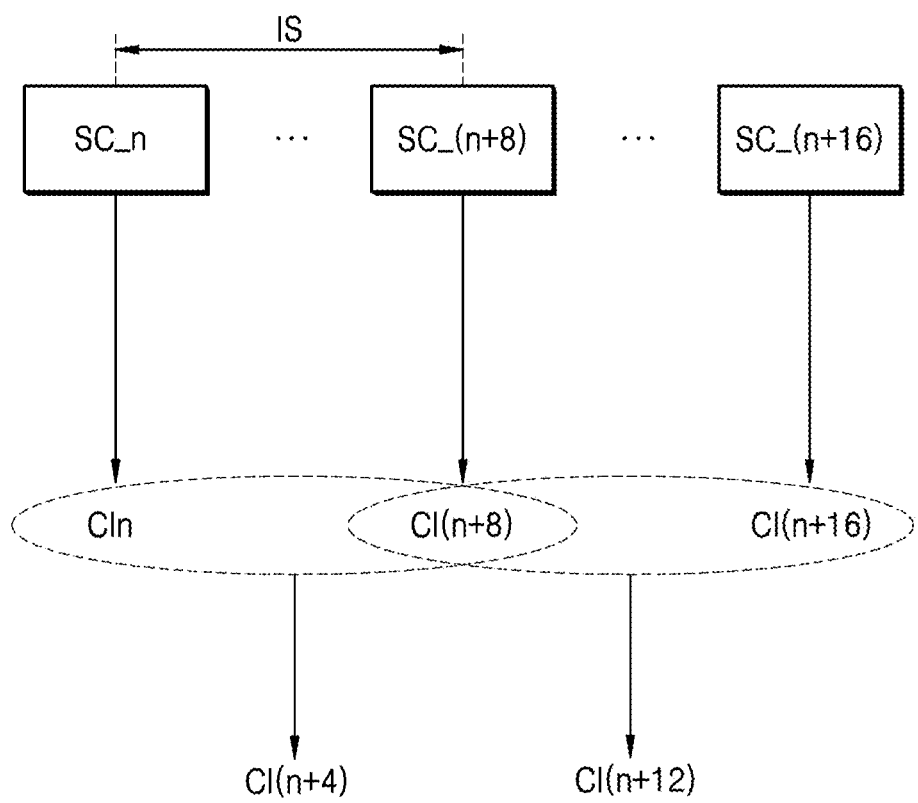
FIG. 7B is a diagram illustrating an operation of interpolating a wireless communication apparatus based on the table diagram of FIG. 7A.

FIG. 7A is a diagram of a second table Table2 showing interpolation spacings according to an example embodiment. FIG. 7B is a diagram illustrating an operation of interpolating a wireless communication apparatus based on the second table Table2 of FIG. 7A. However, the following descriptions will now be presented for simplicity, but it will be understood that they are merely examples and the inventive concepts are not limited thereto. It is assumed that examples shown in FIGS. 7A and 7B are obtained in a communication environment having a high-efficiency (HE) frame format defined by the IEEE standards.

Referring to FIG. 7A, during a normal beamforming feedback generation operation, the number of reference sub-carriers may differ according to a frequency bandwidth of a channel between the wireless communication apparatus and a base station. That is, when the normal beamforming feedback generation operation is performed in the communication environment having the HE frame format, the wireless communication apparatus may generate channel information pieces corresponding to some sub-carriers, from among a plurality of sub-carriers and generate beamforming feedback including the channel information pieces. For example, the wireless communication apparatus may generate one channel information piece corresponding to one sub-carrier, from among four sub-carriers adjacently arranged on a frequency axis.

During the normal beamforming feedback generation operation, the number of reference sub-carriers may be 64 at a frequency bandwidth of 20 MHz, be 122 at a frequency bandwidth of 40 MHz, be 250 at a frequency bandwidth of 80 MHz, and be 506 at a frequency bandwidth of 160 MHz. When an interpolation spacing IS is set to '8' in the wireless communication apparatus, the number of reference sub-carriers may be 34 at a frequency bandwidth of 20 MHz, be 62 at a frequency bandwidth of 40 MHz, be 126 at a frequency bandwidth of 80 MHz, and be 254 at a frequency bandwidth of 160 MHz. When the interpolation spacing IS is set to '16' in the wireless communication apparatus, the number of reference sub-carriers may be 20 at a frequency bandwidth of 20 MHz, be 32 at a frequency bandwidth of 40 MHz, be 64 at a frequency bandwidth of 80 MHz, and be 128 at a frequency bandwidth of 160 MHz. When the interpolation spacing IS is set to '32' in the wireless communication apparatus, the number of reference sub-carriers may be 12 at a frequency bandwidth of 20 MHz, be 18 at a frequency bandwidth of 40 MHz, be 34 at a frequency bandwidth of 80 MHz, and be 66 at a frequency bandwidth of 160 MHz. In an example embodiment, an interpolation spacing IS in a low-complexity beamforming feedback generation operation may be defined as the L-th power of 2 (here, L is an integer more than or equal to 3).

As described above, interpolation spacing IS may be varied based on a selectivity of the channel between the wireless communication apparatus and the base station. For example, the interpolation spacing IS may be reduced in an environment in which the selectivity of the channel is high, while the interpolating spacing IS may be increased in an environment in which the selectivity of the channel is low. As a result, the wireless communication apparatus may perform a flexible low-complexity beamforming feedback generation operation according to the state of the channel.

Referring to FIG. 7B, an interpolation operation may be performed using an n-th channel information piece CIn corresponding to an n-th sub-carrier SC_n and an (n+8)-th channel information piece CI(n+8) corresponding to an (n+8)-th sub-carrier SC_(n+8), which is apart from the n-th sub-carrier SC_n by an interpolation spacing IS of '8,' to generate a channel information piece CI(n+4) corresponding to an (n+4)-th sub-carrier. Also, an interpolation operation may be performed using the (n+8)-th channel information piece CI(n+8) corresponding to the (n+8)-th sub-carrier SC_(n+8) and an (n+16)-th channel information piece CI(n+16) corresponding to an (n+16)-th sub-carrier SC_(n+16), which is apart from the (n+8)-th sub-carrier SC_(n+8) by the interpolation spacing IS of '8,' to generate a channel information piece CI(n+12) corresponding to an (n+12)-th sub-carrier.

In another example, when the interpolation spacing IS is '16,' an interpolation operation may be performed using the n-th channel information piece CIn corresponding to the n-th sub-carrier SC_n and the (n+16)-th channel information piece CI(n+16) corresponding to the (n+16)-th sub-carrier SC_(n+16), which is apart from the n-th sub-carrier SC_n by an interpolation spacing IS of '16,' to generate channel information pieces CI(n+4), CI(n+8), and CI(n+12) corresponding respectively to the (n+4)-th, (n+8)-th, and (n+12)-th sub-carriers.

Figure 8:
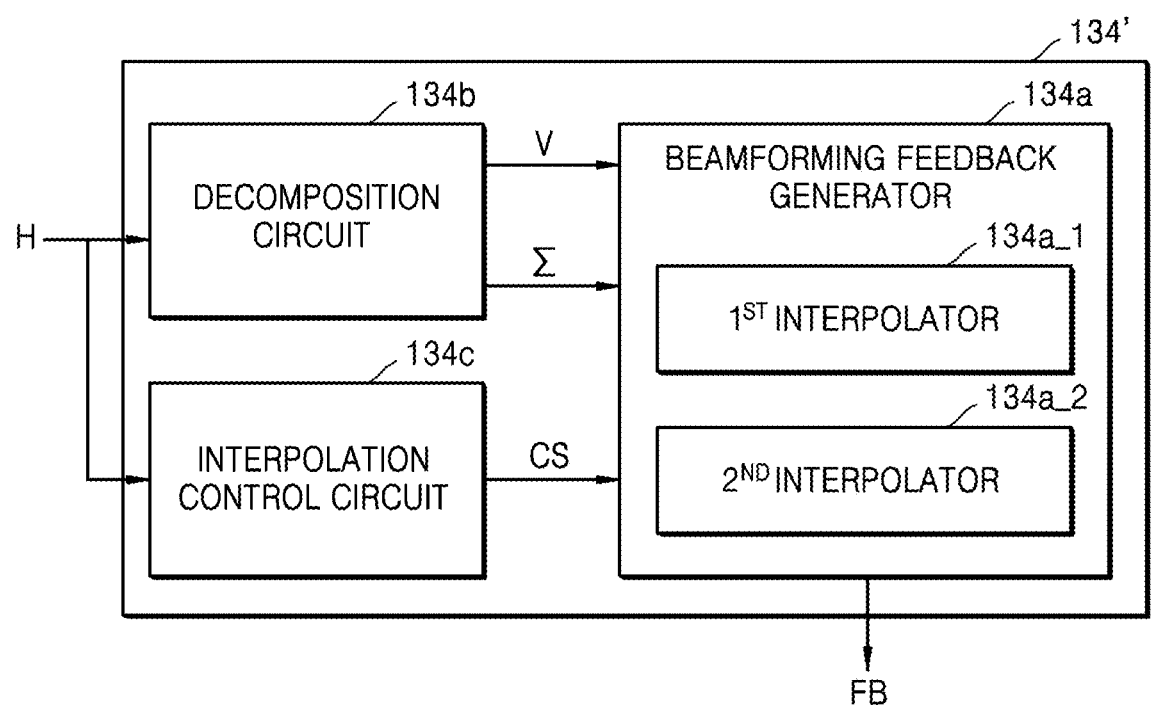
FIG. 8 is a block diagram of a link adaptor according to an example embodiment.

FIG. 8 is a block diagram of a link adaptor 134' according to an example embodiment. Hereinafter, the same description as that of the link adaptor 134 of FIG. 3, or redundant description, will be omitted.

Referring to FIG. 8, as compared to the link adaptor 134 of FIG. 3, the link adaptor 134' may further include an interpolation control circuit 134c. The interpolation control circuit 134c may receive estimated first channels H corresponding to first sub-carriers, from among a plurality of sub-carriers, and determine a selectivity of a downlink channel between a wireless communication apparatus and a base station. The interpolation control circuit 134c may generate an interpolation control signal CS, based on the selectivity of the downlink channel, and provide the interpolation control signal CS to the beamforming feedback generator 134a, and thus, a low-complexity beamforming feedback generation operation may be controlled. For example, the interpolation control circuit 134c may calculate a delay spread or a variance of an estimated downlink channel (or the estimated first channels H) and determine the selectivity of the downlink channel based on the calculation result.

According to some example embodiments, operations described herein as being performed by wireless communication apparatus 100, the RF circuit 120, the processor 130, the channel estimator 132, the link adaptor 134, the beamforming feedback generator 134a, the decomposition circuit 134b, the first interpolator 134a_1, the second interpolator 134_2, the compressor 134a_3, the CSI generation circuit 134a_4, the SNR calculator 134a_5, the link adaptor 134' and/or the interpolation control circuit 134c may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In an example embodiment, when the selectivity of the downlink channel is less than a threshold value, the interpolation control circuit 134c may control the beamforming feedback generator 134a to perform the low-complexity beamforming feedback generation operation. When the selectivity of the downlink channel exceeds the threshold value, the interpolation control circuit 134c may control the beamforming feedback generator 134a to perform a normal beamforming feedback generation operation.

In an example embodiment, when the beamforming feedback generator 134a performs the low-complexity beamforming feedback generation operation, the interpolation control circuit 134c may determine the number of reference sub-carriers or an interpolation spacing. For example, the interpolation control circuit 134c may increase the number of reference sub-carriers or reduce the interpolation spacing with an increase in the selectivity of the downlink channel. In contrast, the interpolation control circuit 134c may reduce the number of reference sub-carriers or increase the interpolation spacing with a reduction in the selectivity of the downlink channel. According to some example embodiments, the interpolation control circuit 134c may select the reference sub-carriers (e.g., the first sub-carriers) from among the plurality of sub-carriers based on the determined number of reference sub-carriers.

Although not shown in FIG. 8, the interpolation control circuit 134c may provide a control signal to the channel estimator (refer to 132 in FIG. 1) to perform a channel estimation operation corresponding to the low-complexity beamforming feedback generation operation or the normal beamforming feedback generation operation, or to perform a channel estimation operation corresponding to the determined number of reference sub-carriers or the determined interpolation spacing.

Figure 9:
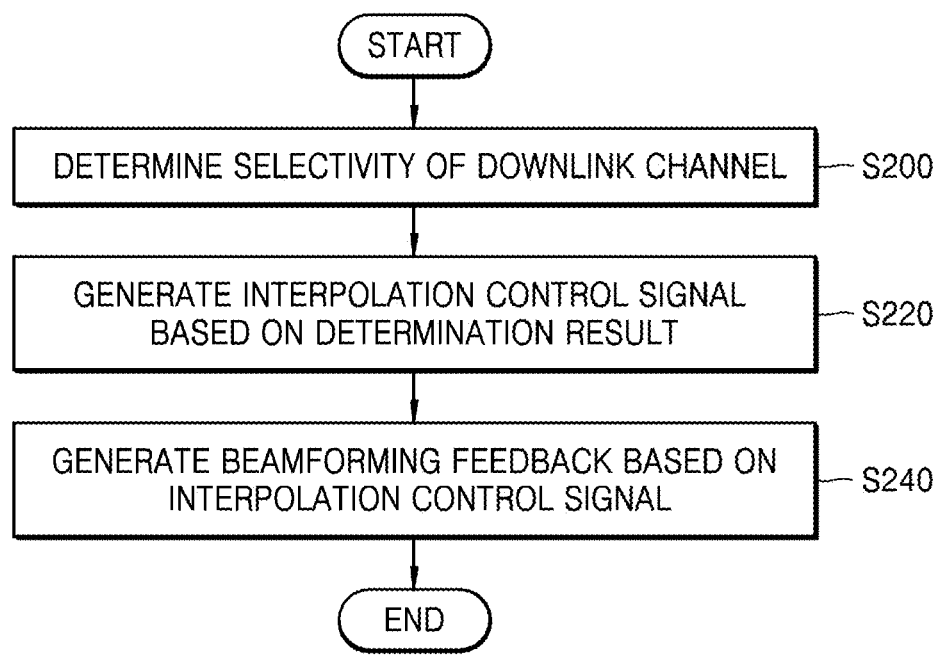
FIG. 9 is a flowchart illustrating an operation of the link adaptor of FIG. 8.

FIG. 9 is a flowchart illustrating an operation of the link adaptor 134' of FIG. 8.

Referring to FIGS. 8 and 9, in operation S200, the interpolation control circuit 134c may determine the selectivity of the downlink channel between the wireless communication apparatus and the base station. In operation S220, the interpolation control circuit 134c may generate an interpolation control signal for controlling the low-complexity beamforming feedback generation operation or the normal beamforming feedback generation operation, based on the determination result. In operation S240, the beamforming feedback generator 134a may generate beamforming feedback based on the interpolation control signal.

Figure 10:
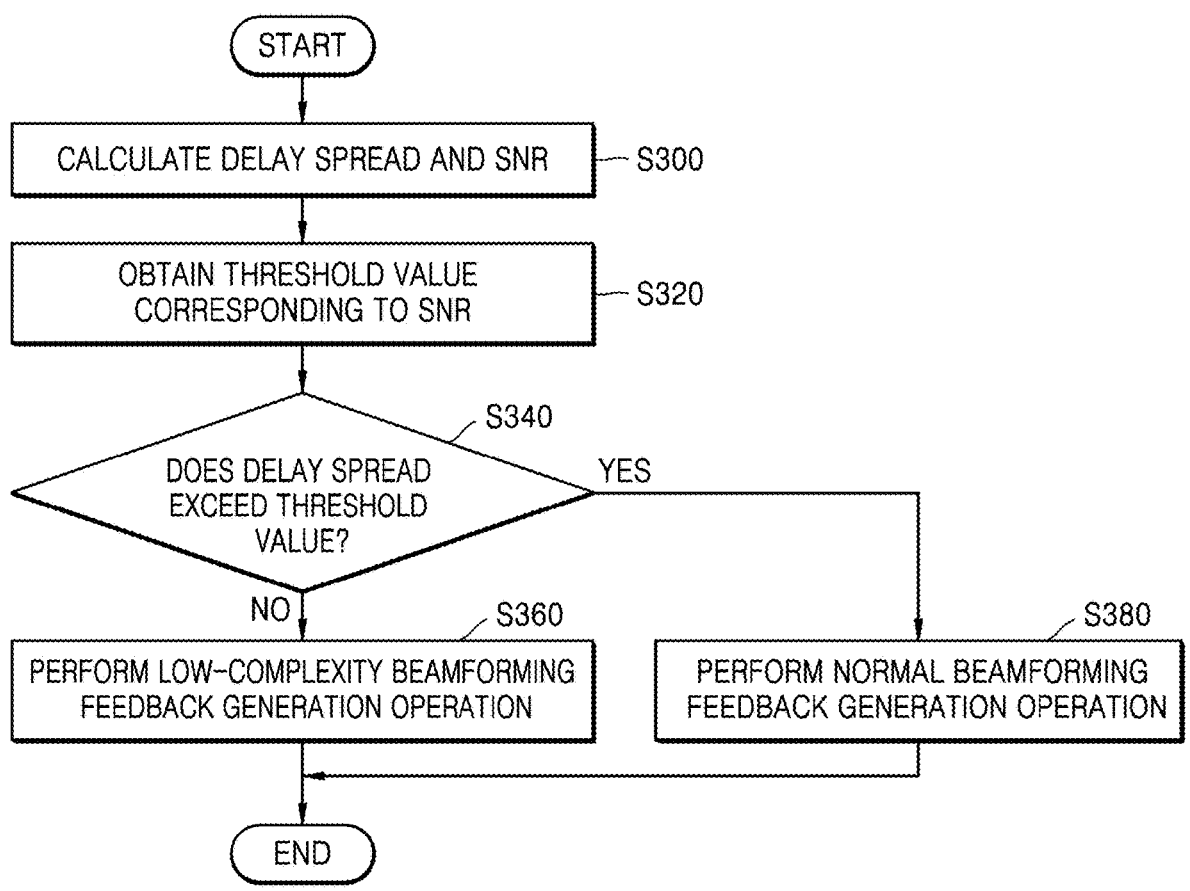
FIG. 10 is a flowchart illustrating a method of operating a wireless communication apparatus, according to an example embodiment.
Figure 11A:
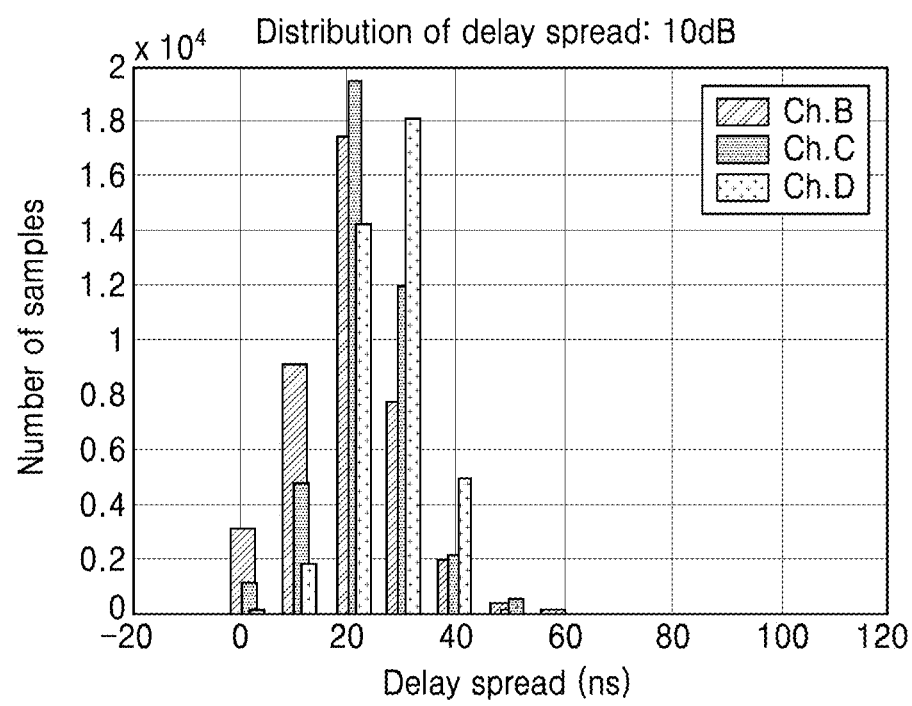
FIGS. 11A and 11B are graphs showing a delay spread of a downlink channel relative to a signal-to-noise ratio (SNR)
Figure 11B:
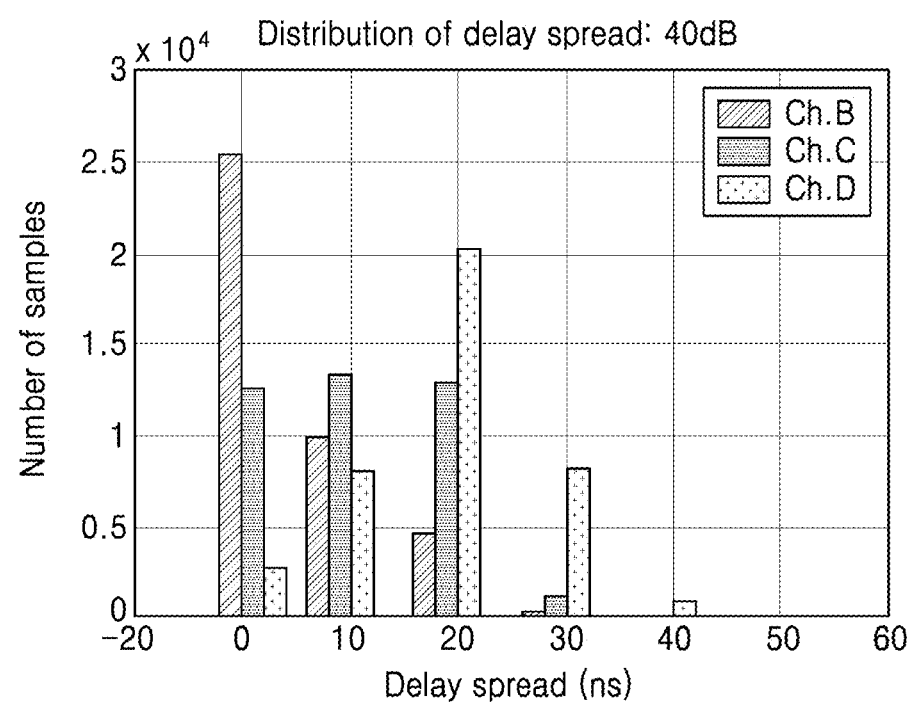

FIG. 10 is a flowchart illustrating a method of operating a wireless communication apparatus, according to an example embodiment. FIGS. 11A and 11B are graphs showing a delay spread of a downlink channel relative to an SNR. FIG. 12 is a diagram of a third table Table3 showing the arrangement of threshold values with respect to SNRs, wherein the threshold values are used as criteria for selecting any one of a low-complexity beamforming feedback generation operation and a normal beamforming feedback generation operation.

Referring to FIG. 10, in operation S300, the wireless communication apparatus may calculate a delay spread of an estimated downlink channel and/or an SNR of a sounding packet received from a base station (e.g., a SNR corresponding to the downlink channel 20). Referring to FIGS. 11A and 11B, a type of the delay spread of the downlink channel may be different according to a value of the SNR. FIG. 11A is a graph obtained under the assumption that the SNR is 10 dB, and FIG. 11B is a graph obtained under the assumption that the SNR is 40 dB. First to third downlink channels Ch.B to Ch.D may be assumed to be formed between the wireless communication apparatus and the base station in respectively different communication environments. Delay spreads of the first to third downlink channels Ch.B to Ch.D in FIG. 11A may have wider distributions than delay spreads of the first to third downlink channels Ch.B to Ch.D in FIG. 11B.

For the above-described reason, a threshold value may be different according to a value of the SNR as shown in the third table Table3 of FIG. 12. For example, a threshold value may be set to 100 ns at an SNR of 8 dB, set to 80 ns at an SNR of 16 dB, set to 60 ns at an SNR of 24 dB, set to 40 ns at an SNR of 32 dB, set to 20 ns at an SNR of 40 dB, and set to 10 ns at an SNR of 48 dB. That is, a threshold value corresponding to each SNR may be set in view of the fact that a delay spread of a downlink channel is reduced with an increase in SNR.

Referring back to FIG. 10, in operation S320, the wireless communication apparatus may obtain a threshold value corresponding to the calculated SNR with reference to the third table Table3 of FIG. 12. Specifically, the wireless communication apparatus may search for the same SNR as, or a similar SNR to, the calculated SNR in the third table Table3 and obtain a threshold value corresponding to the found SNR. Furthermore, when the same SNR as, or a similar SNR to, the calculated SNR is not found in the third table Table3, the wireless communication apparatus may interpolate threshold values corresponding to SNRs similar to the calculated SNR and obtain a threshold value corresponding to the calculated SNR.

In operation S340, the wireless communication apparatus may determine whether the delay spread exceeds the obtained threshold value. If it is determined that a result of operation S340 is 'No,' operation S360 may be subsequently performed, and thus, the wireless communication apparatus may perform the low-complexity beamforming feedback generation operation. Otherwise, if it is determined that the result of operation S340 is 'Yes,' operation S380 may be subsequently performed, and thus, the wireless communication apparatus may perform the normal beamforming feedback generation operation.

Figure 13:
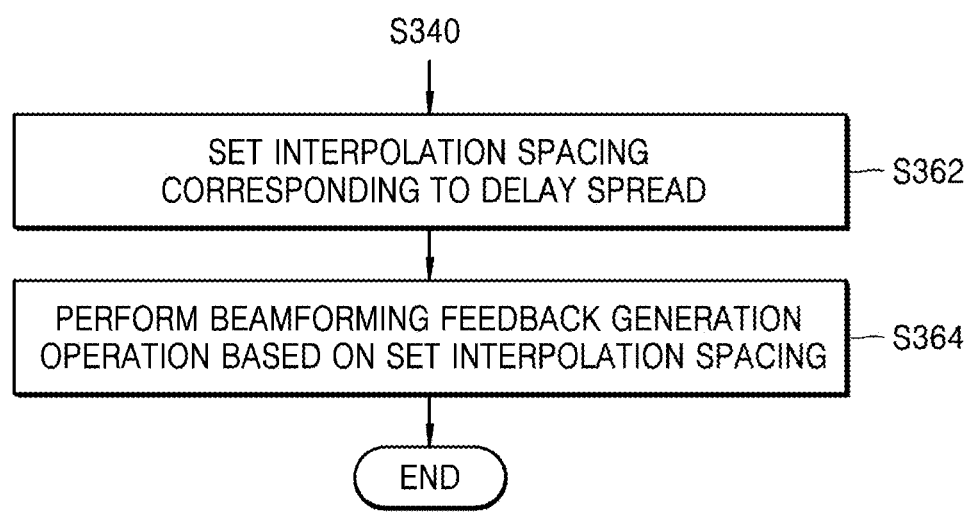
FIG. 13 is a detailed flowchart of operation S360, which is subsequent to operation S340 of FIG. 10.

FIG. 13 is a detailed flowchart of operation S360, which is subsequent to operation S340 of FIG. 10.

Referring to FIG. 13, in operation S362 subsequent to operation (refer to S340 in FIG. 10), the wireless communication apparatus may determine an interpolating spacing (or the number of reference sub-carriers) corresponding to the delay spread. For example, the wireless communication apparatus may set the interpolating spacing to a smaller value (or set the number of reference sub-carriers to a larger value) with an increase in the delay spread. In contrast, the wireless communication apparatus may set the interpolating spacing to a larger value (or set the number of reference sub-carriers to a smaller value) with a reduction in the delay spread. In operation S364, the wireless communication apparatus may perform a beamforming feedback generation operation based on the set interpolation spacing (or the set number of reference sub-carriers).

Figure 14:
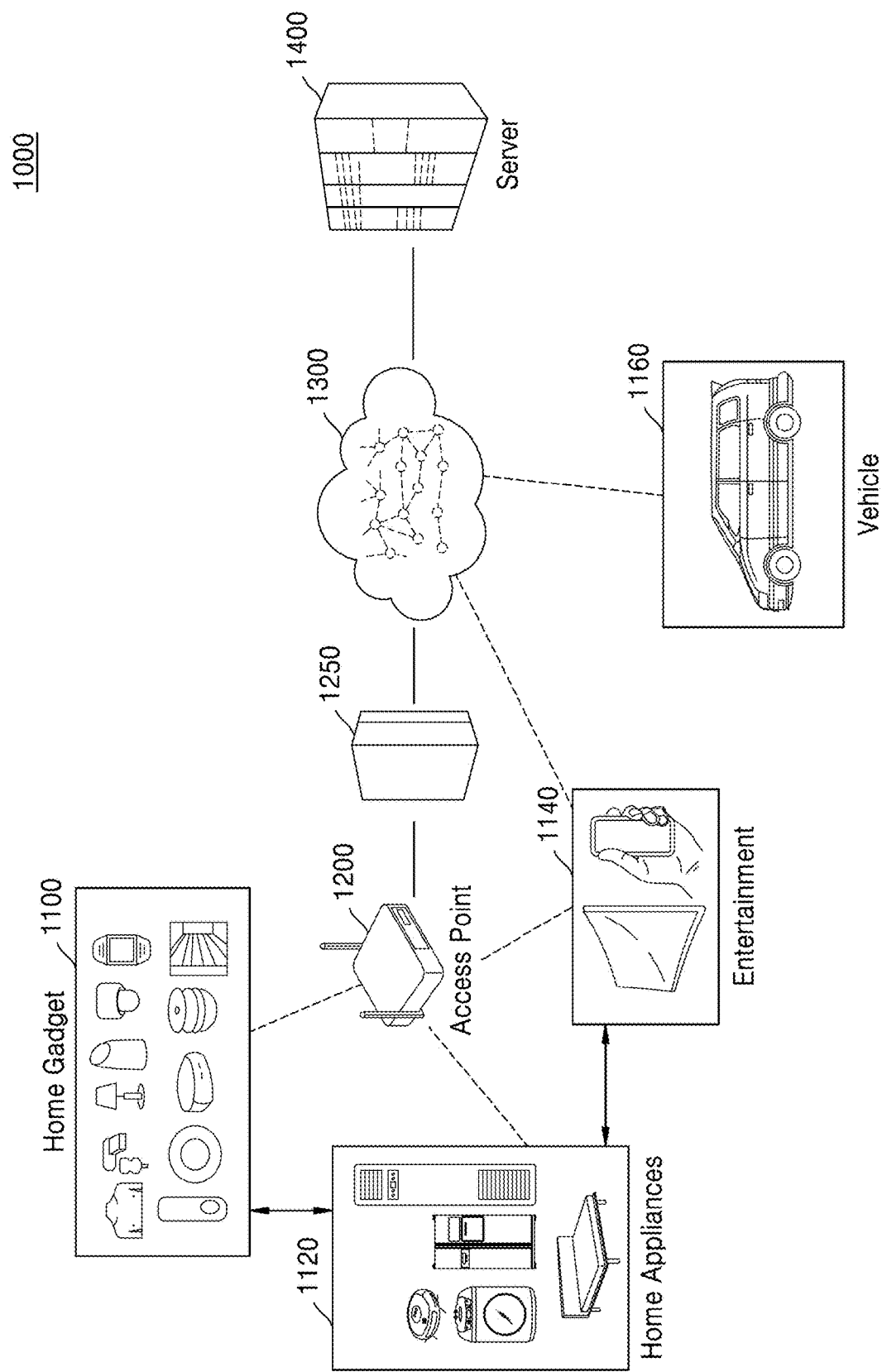
FIG. 14 is a conceptual diagram of an Internet of Things (IoT) network system to which embodiments are applied.

FIG. 14 is a conceptual diagram of an Internet of Things (IoT) network system 1000 to which embodiments are applied.

Referring to FIG. 14, the IoT network system 1000 may include a plurality of IoT devices (e.g., a home gadget group 1100, a home appliance/furniture group 1120, an entertainment group 1140, and/or a vehicle group 1160), an AP 1200, a gateway 1250, a wireless network 1300, and/or a server 1400. IoT may refer to a network between things using wired/wireless communication.

The IoT devices, that is, the home gadget group 1100, the home appliance/furniture group 1120, the entertainment group 1140, and/or the vehicle group 1160, may form groups according to characteristics thereof. For example, the IoT devices may be grouped into the home gadget group 1100, the home appliance/furniture group 1120, the entertainment group 1140, or the vehicle group 1160. The IoT devices, that is, the home gadget group 1100, the home appliance/furniture group 1120, and the entertainment group 1140, may be connected to a communication network or another IoT device through the AP 1200. The AP 1200 may be embedded in one IoT device. The gateway 1250 may change a protocol to connect the AP 1200 to an external wireless network. The IoT devices, that is, the home gadget group 1100, the home appliance/furniture group 1120, and the entertainment group 1140, may be connected to an external communication network through the gateway 1250. The wireless network 1300 may include the Internet and/or a public network. The IoT devices, that is, the home gadget group 1100, the home appliance/furniture group 1120, the entertainment group 1140, and the vehicle group 1160, may be connected to the server 1400, which provides a predetermined or alternatively, given service, through the wireless network 1300, and a user may use the predetermined or alternatively, given service through at least one of the IoT devices, that is, the home gadget group 1100, the home appliance/furniture group 1120, the entertainment group 1140, and the vehicle group 1160.

According to example embodiments, each of the IoT devices, that is, the home gadget group 1100, the home appliance/furniture group 1120, the entertainment group 1140, and the vehicle group 1160, may include processing circuitry (e.g., a processor). Each processor may perform a low-complexity beamforming feedback generation operation and provide beamforming feedback to the AP 1200 or the wireless network 1300. A base station connected to the AP 1200 or the wireless network 1300 may perform operations (e.g., a beamforming operation) related to wireless communication, based on the beamforming feedback.

Figure 15:
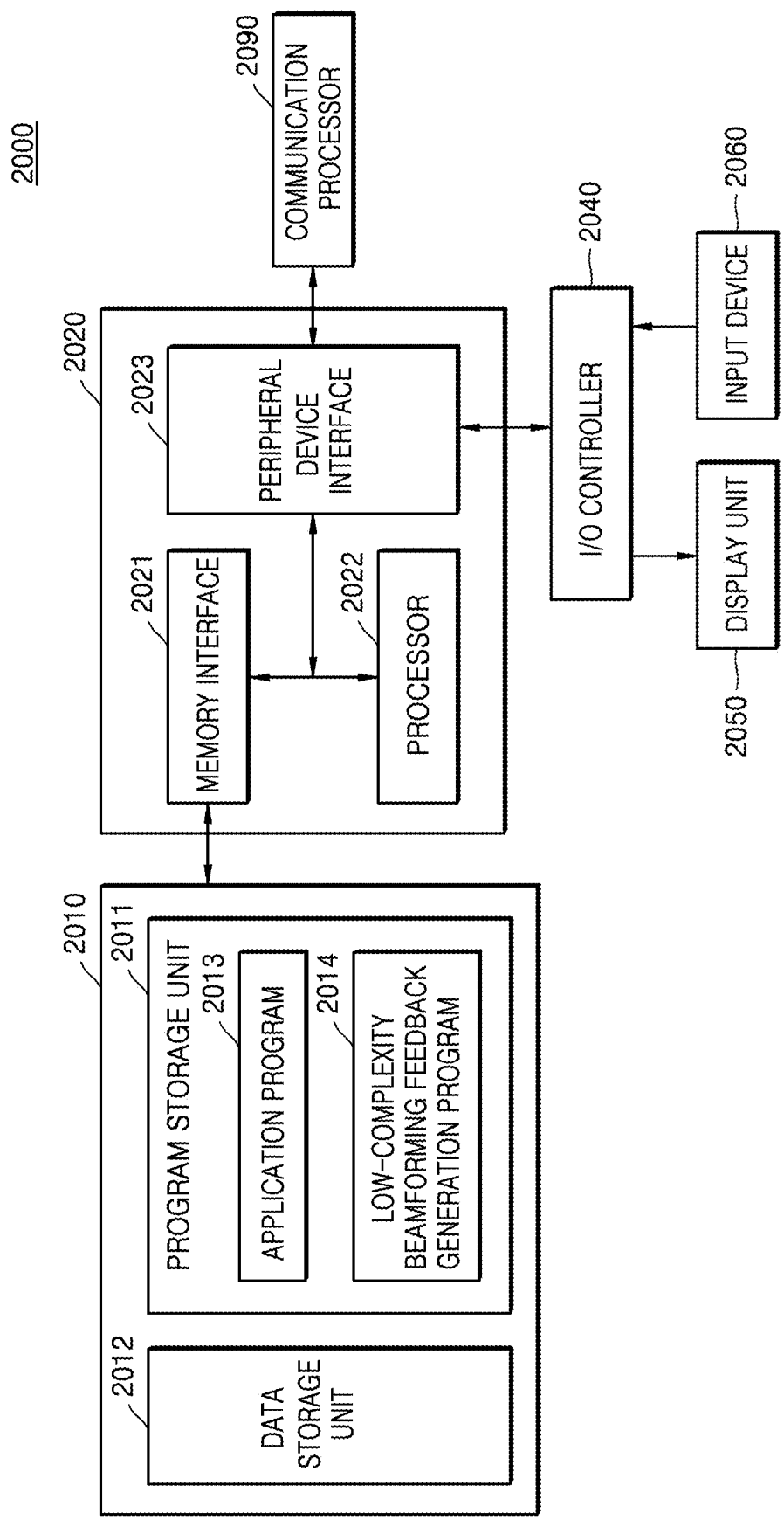
FIG. 15 is a block diagram of an electronic device according to an example embodiment.

FIG. 15 is a block diagram of an electronic device 2000 according to an example embodiment.

Referring to FIG. 15, the electronic device 2000 may include a memory 2010, a processor unit 2020, an input/output (I/O) controller 2040, a display unit 2050, an input device 2060, and/or a communication processor 2090. Here, the electronic device 2000 may include a plurality of memories 2010. Each component of the electronic device 2000 will now be described.

The memory 2010 may include a program storage unit 2011 configured to store a program for controlling an operation of the electronic device 2000 and/or a data storage unit 2012 configured to store data generated during the program. The data storage unit 2012 may store data used for operations of an application program 2013 and/or a low-complexity beamforming feedback generation program 2014. The program storage unit 2011 may include the application program 2013 and/or the low-complexity beamforming feedback generation program 2014. Here, the program in the program storage unit 2011 may be expressed as an instruction set, which is a set of instructions.

The application program 2013 may include an application program, which operates in the electronic device 2000. That is, the application program 2013 may include instructions of an application that is driven by processing circuitry 2022 (e.g., a processor). According to example embodiments, the low-complexity beamforming feedback generation program 2014 may generate channel information pieces corresponding to reference sub-carriers and perform an interpolation operation using the generated channel information pieces to generate channel information pieces corresponding to other sub-carriers. Thus, the amount of calculations for generating the beamforming feedback may be reduced.

A peripheral device interface 2023 may control the connection of an I/O peripheral device of a base station with the processing circuitry 2022 and/or a memory interface 2021. The processing circuitry 2022 may control the base station to provide a service corresponding thereto by using at least one software program. In this case, the processing circuitry 2022 may execute at least one program stored in the memory 2010 and provide the corresponding service to the executed program.

The I/O controller 2040 may interface between an I/O device (e.g., the display unit 2050 and/or the input device 2060) and the peripheral device interface 2023. The display unit 2050 may display state information, input characters, moving pictures, and/or still pictures. For example, the display unit 2050 may display information about an applied program, which is driven by the processing circuitry 2022.

The input device 2060 may provide input data, which is generated by the selection of the electronic device 2000, through the I/O controller 2040 to the processor unit 2020. In this case, the input device 2060 may include a keypad including at least one hardware button and/or a touch pad configured to sense touch information. For example, the input device 2060 may provide touch information (e.g., touch, touch movement, and touch release), which is sensed through the touch pad, to the processing circuitry 2022 through the I/O controller 2040. The electronic device 2000 may include the communication processor 2090 that performs communication functions for voice communication and/or data communication.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. A method of operating a wireless communication apparatus configured to support adaptive beamforming of a base station, the method comprising:
   receiving a sounding packet from the base station through a plurality of sub-carriers;
   generating first channel information corresponding to first sub-carriers among the plurality of sub-carriers based on the sounding packet;
   performing an interpolation operation using the first channel information to generate second channel information corresponding to second sub-carriers among the plurality of sub-carriers;
   generating first beamforming feedback including the first channel information and the second channel information; and
   transmitting the first beamforming feedback to the base station, wherein
   the first channel information is of an angular type generated using beam-steering matrices, the beam-steering matrices being obtained using a singular value decomposition process, or
   the first channel information includes singular values of diagonal matrices, the diagonal matrices obtained using the singular value decomposition process.

2. The method of claim 1, wherein the first sub-carriers have a constant frequency spacing therebetween, the constant frequency spacing corresponding to an interpolation spacing.

3. The method of claim 1, wherein the generating of the first channel information comprises:
   estimating first channels corresponding to the first sub-carriers using the sounding packet to obtain estimated first channels;
   performing the singular value decomposition process on the estimated first channels; and
   generating the first channel information of the angular type using the beam-steering matrices.

4. The method of claim 3, wherein the performing of the interpolation operation comprises generating the second channel information by applying an angular interpolation scheme to the first channel information.

5. The method of claim 1, wherein the generating of the first channel information comprises:
   estimating first channels corresponding to the first sub-carriers using the sounding packet to obtain estimated first channels;
   performing the singular value decomposition process on the estimated first channels; and
   generating the first channel information including the singular values of the diagonal matrices.

6. The method of claim 5, wherein the performing of the interpolation operation comprises generating the second channel information by applying a linear interpolation scheme to the first channel information.

7. The method of claim 1, wherein a number of first sub-carriers varies according to a selectivity of a channel between the base station and the wireless communication apparatus.

8. The method of claim 1, further comprising:
   determining a selectivity of a channel between the base station and the wireless communication apparatus to obtain a determined selectivity; and
   determining whether to perform the interpolation operation based on the determined selectivity.

9. The method of claim 8, wherein the determining of whether to perform the interpolation operation comprises:
   calculating a signal-to-noise ratio (SNR) corresponding to the channel using the sounding packet;
   obtaining a threshold value corresponding to the calculated SNR;
   determining whether a delay spread or a channel variance exceeds the threshold value to obtain a determination result, the delay spread or the channel variance indicating the selectivity of the channel; and
   determining whether to perform the interpolation operation based on the determination result.

10. The method of claim 8, wherein the performing of the interpolation operation performs the interpolation operation in response to determining to perform the interpolation operation based on the determined selectivity.

11. A method of operating a wireless communication apparatus configured to support adaptive beamforming of a base station, the method comprising:
    receiving a sounding packet from the base station through a plurality of sub-carriers;

selecting first sub-carriers from among the plurality of sub-carriers based on a selectivity of a channel between the base station and the wireless communication apparatus; and selectively performing a normal beamforming feedback generation operation or a low-complexity beamforming feedback generation operation based on the selectivity of the channel, wherein the normal beamforming feedback generation operation is performed to directly generate first channel information corresponding to the first sub-carriers and second channel information corresponding to second sub-carriers among the plurality of sub-carriers, and the low-complexity beamforming feedback generation operation is performed to indirectly generate the second channel information based on an interpolation operation using the first channel information.

12. The method of claim 11, wherein the selecting of the first sub-carriers comprises selecting the first sub-carriers such that a number of first sub-carriers is increased as the selectivity of the channel increases.

13. The method of claim 11, wherein the selecting of the first sub-carriers selects the first sub-carriers based on a frame format supported by the base station.

14. The method of claim 11, wherein the selectively performing of the normal beamforming feedback generation operation or the low-complexity beamforming feedback generation operation comprises:

determining whether a delay spread or a channel variance exceeds a threshold value, the delay spread or the channel variance indicating the selectivity of the channel; and performing the low-complexity beamforming feedback generation operation based on the delay spread or the channel variance being less than or equal to the threshold value.

15. The method of claim 14, wherein the threshold value varies according to a signal-to-noise ratio (SNR) corresponding to the channel.

16. The method of claim 14, wherein the low-complexity beamforming feedback generation operation comprises:

generating the second channel information based on an interpolation scheme corresponding to a type of the first channel information; and generating beamforming feedback including the first channel information and the second channel information.

17. The method of claim 16, wherein the interpolation scheme corresponds to an angular interpolation scheme based on the first channel information including a phase or a size of a beam-steering matrix corresponding to the first sub-carriers; and the interpolation scheme corresponds to a linear interpolation scheme based on the first channel information including information about a singular value of a diagonal matrix corresponding to the first sub-carriers.

18. A beamforming method of a wireless communication system comprising a base station and a wireless communication apparatus, the method comprising:

receiving a sounding packet from the base station through a plurality of sub-carriers, wherein the receiving is performed by the wireless communication apparatus;

generating first channel information corresponding to first sub-carriers among the plurality of sub-carriers using the sounding packet, wherein the generating is performed by the wireless communication apparatus;

generating second channel information corresponding to second sub-carriers among the plurality of sub-carriers based on an interpolation operation using the first channel information, wherein the generating is performed by the wireless communication apparatus;

transmitting beamforming feedback including the first channel information and the second channel information to the base station, wherein the transmitting is performed by the wireless communication apparatus; and receiving a data signal to which beamforming is applied from the base station based on the beamforming feedback, wherein the receiving is performed by the wireless communication apparatus, wherein the first channel information is of an angular type generated using beam-steering matrices, the beam-steering matrices being obtained using a singular value decomposition process, or the first channel information includes singular values of diagonal matrices, the diagonal matrices obtained using the singular value decomposition process.

19. The method of claim 18, further comprising:

determining a selectivity of a channel between the wireless communication apparatus and the base station, wherein the determining is performed by the wireless communication apparatus;

setting an interpolation spacing of the interpolation operation based on the selectivity of the channel, wherein the setting is performed by the wireless communication apparatus; and setting a number of first sub-carriers based on to the interpolation spacing.

20. The method of claim 18, wherein the wireless communication apparatus is configured to:

generate the beamforming feedback in a short inter-frame space (SFIS); and transmit the beamforming feedback to the base station.

* * * * *